March 19, 1963 E. THIELENHAUS 3,082,013
CENTERING HOLDER FOR WORKPIECES
Filed Sept. 8, 1960 2 Sheets-Sheet 1

Ernst Thielenhaus
INVENTOR.

BY
AGENT.

March 19, 1963 E. THIELENHAUS 3,082,013
CENTERING HOLDER FOR WORKPIECES
Filed Sept. 8, 1960 2 Sheets-Sheet 2

Ernst Thielenhaus
INVENTOR.

BY Karl F. Ross
AGENT.

United States Patent Office 3,082,013
Patented Mar. 19, 1963

3,082,013
CENTERING HOLDER FOR WORKPIECES
Ernst Thielenhaus, Wuppertal-Barmen, Germany, assignor to Firma Ernst Thielenhaus, Maschinenfabrik, Wuppertal-Barmen, Germany, a company of Germany
Filed Sept. 8, 1960, Ser. No. 54,651
Claims priority, application Germany Sept. 11, 1959
14 Claims. (Cl. 279—16)

My present invention relates to a workpiece holder and to a method of centering a workpiece in such holder.

Heretofore, chucks, collets and similar clamping devices, designed to secure a workpiece for machining, were generally provided with workpiece-engaging jaws which were urged thereagainst. Such devices applied considerable pressure upon the workpieces and, when used to hold relatively thin-walled objects and annular members, tended to deform them during the machining processes and thus were not suited for precision work. Magnetic chucks or faceplates, while free from this drawback, were not able to secure the workpieces against machining forces applied in planes parallel to that of the magnetic surface and were not applicable to the processing of non-ferrous metals, plastics and similar non-magnetizable materials.

It is the general object of this invention to provide an improved workpiece-holding device of relatively simple construction and adapted to obviate the aforementioned disadvantages of the conventional holders while maintaining the workpiece accurately centered for machining operations, such as chip removal grinding and honing, and to maintain the workpiece in its predetermined position even under the influence of external forces (e.g. the forces exerted by the machining tools).

It is also an object of the invention to provide a method of centering a workpiece in a holder of this character.

According to the invention, I provide an internal or external holder having a closed surface conforming to the configuration of a confronting surface of a workpiece and limitedly spaced therefrom. I have found that a laminar flow of fluid in the space between the aforementioned confronting surfaces tends to maintain the workpiece in a predetermined spaced relationship to the surfaces of the holder even while the workpiece is engaged by a tool. Means may also be provided for frictionally or positively coupling the rotatable holder with the workpiece for entraining the latter while leaving it free to center itself on the holder under the action of the fluid introduced, preferably under pressure, into the narrow annular clearance between workpiece and holder.

The most advantageous spacing between confronting surfaces of the workpiece and the holder may be determined in accordance with the well known relations of laminar flow wherein the Reynolds condition therefor, with suitable adjustment for the shape of the clearance, is observed. The Reynolds number R, which must be maintained below the critical value thereof for laminar flow, is proportional to the fluid density $\rho$, the velocity $V$, a factor $4K$, and the kinematic viscosity $\mu$ of the fluid in accordance with the relationship $$R = \frac{V \cdot 4K \cdot \rho}{\mu}$$

where K is the hydraulic radius of the space and is equal to the cross-sectional area thereof divided by the wetted perimeter. For air, the preferred spacing has been found to be between substantially 0.01 and 0.02 mm. Greater tolerances may be provided when viscous liquids such as oil are used. Conventional coolant liquids may also be used as the pressure fluid for the holder, thereby controlling the workpiece temperature during machining steps.

According to a more specific feature of the invention the pressure-fluid outlets of the holder are equispaced about the center of the workpiece, regardless of its configuration, so that substantially no resultant force is applied to its center of gravity. The workpiece may be suspended upon a cushion of pressurized fluid which applies a centering force, preferably in a direction generally perpendicular to its engaged surface, either toward the center of the workpiece against an outer peripheral surface thereof or outwardly from the center against an inner surface. The workpiece may be displaced, together with its holder, relatively to a tool or held stationary while the latter is displaced.

Furthermore, the confronting surface of the holder may be provided with grooves in which the fluid outlets terminate and which stabilize the fluid cushion. Such grooves advantageously are disposed opposite the confronting surfaces of the workpiece. The holder may be employed, for example, in the manufacture of ball-bearing races which require grinding or honing to finish the ball-contacting surfaces and are generally in the shape of rings which may be distorted in conventional clamping chucks. The outer and inner peripheral surfaces of such a ring may be finished while the ring is held centered, in the aforedescribed manner, on an internal holder or mandrel and in an outer holder or chuck respectively.

The above and other objects, features and advantages of my present invention will become more readily apparent from the following detailed description, reference being made to the accompanying drawing in which.

Figure 1A:
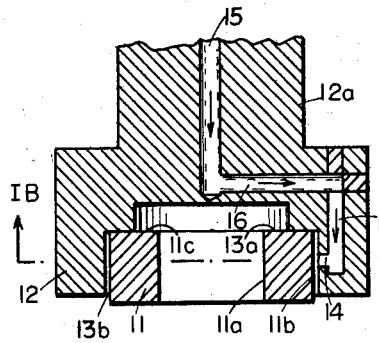
FIG. 1A is an axial cross-sectional view of a centering chuck for ball-bearing races, according to the invention.
Figure 1B:
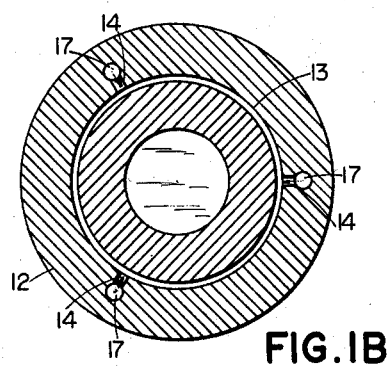
FIG. 1B is a cross-sectional view taken along line IB—IB of FIG. 1A.

In FIGS. 1A and 1B of the drawing I show an external holder or chuck 12 for a ball-bearing race 11 which is to be machined upon its internal surface 11a. Chuck 12 comprises a shank 12a, which may be received in a conventional lathe headstock or other machine tool, and is provided with a cavity 13 adapted to accommodate the race 11. Cavity 13 is formed with a cylindrical surface 13b which confronts an opposing surface 11b of the race 11 and is limitedly spaced therefrom. An axial conduit 15 in the shank of chuck 12 is connected to a source of fluid pressure, as illustrated schematically in FIG. 3B, and terminates in three radial channels 16 which communicate with angularly equispaced radial inlet bores 14 via longitudinal bores 17. The latter open into the gap between the surfaces 11b and 13b. Cavity 13 is also provided with a shoulder 13a which frictionally engages a surface 11c of the fluid-suspended ring 11 causing entrainment of the latter by the rotating chuck 12. When the fluid introduced into the gap via transmission tubes 14 to 17 is air, the width of the gap is preferably from 0.01 to 0.02 mm.

Figure 2A:
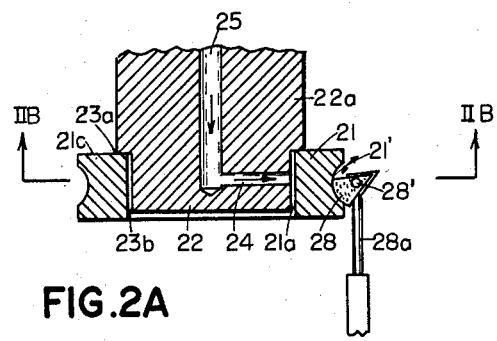
FIG. 2A is an axial cross-sectional view of a centering mandrel according to my invention.
Figure 2B:
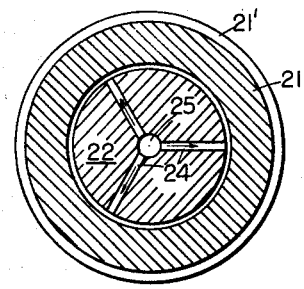
FIG. 2B is a cross-sectional view taken along line IIB—IIB of FIG. 2A.

FIGS. 2A and 2B are illustrative of an internal holder or mandrel 22 in the form of a stub shaft whose shank 22a may be received in a headstock of a machine tool. Mandrel 22 is provided with a surface 23b confronting and spaced from the concentric inner surface 21a of a ball-bearing ring 21 which is formed with a ball-race channel 21'. An axial conduit 25 for fluid under pressure terminates in the angularly equispaced radial bores 24 which open at the surface 23b in the gap between the latter surface and surface 21a of the workpiece. Again, the holder is provided with an annular shoulder 23a which frictionally engages the surface 11c of the ring 21 suspended upon an internal fluid cushion. The peripheral ball channel 21' is illustrated as being honed by an oscillating stone 28 whose center of oscillation 28' lies in the mid-plane of the bearings adapted to run in the channel 21' and which is carried on an arm 28a held in the cross-slide tool rest of the machine for displacement in a direction generally transverse to the axis of the ring 21. A similar stone may, of course, be used to finish an internal ball channel when the ring is held in the chuck 12 of FIGS. 1A and 1B.

Figure 3A:
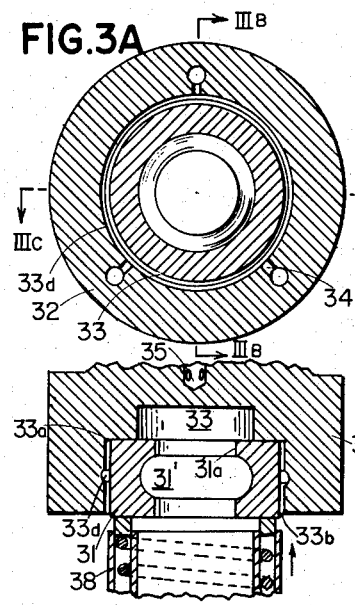
FIG. 3A is a radial cross-sectional view of another embodiment of the invention.
Figure 3B:
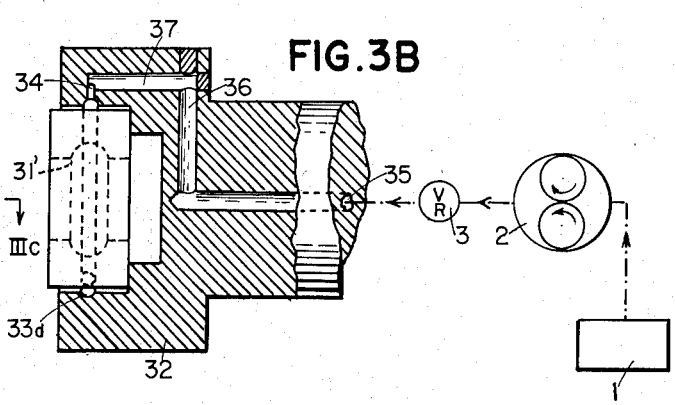
FIG. 3B is a cross-sectional view taken along line IIIB—IIIB of FIG. 3A.
Figure 3C:
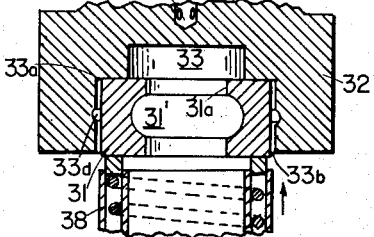
FIG. 3C is a cross-sectional view taken along line IIIC—IIIC of FIG. 3A.

FIGS. 3A, 3B and 3C illustrate an external holder or chuck 32 for a ball-bearing ring 31 formed with a ball channel 31' along its internal surface 31a. The chuck 32, which is generally similar to chuck 12, has the surface 33b of its cavity 33 formed with an annular groove 33d in which the bores 34 terminate. Bores 34, which are angularly equispaced about the ring 31, are connected via the conduits 35, 36 and 37 to a pressure pump 2 through a regulating valve 3. Pump 2 is supplied with fluid from a reservoir 1. The ring 31 is suspended upon an external peripheral cushion of fluid under pressure, present in the gap between surface 33b and the confronting surface 31b of the ring, and is urged against the shoulder 33a of the chuck 32 by a spring-biased tailstock assembly 38 to provide a frictional entrainment of the ring by the chuck.

Figure 4B:
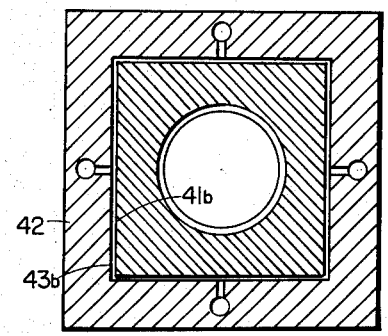
FIG. 4B is a cross-sectional view taken along line IVB—IVB of FIG. 4A.
Figure 4A:
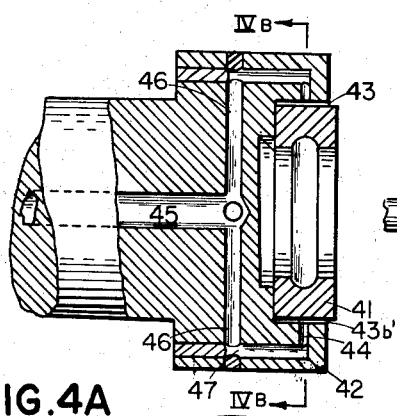
FIG. 4A is an axial cross-sectional view of a chuck for four-sided workpieces.

In FIGS. 4A and 4B I show a chuck 42 for a square workpiece 41 wherein the confronting spaced surfaces 41b and 43b of workpiece 41 and chuck 42, respectively, maintain a laminar-flow fluid cushion to center the workpiece, upon its entrainment by the chuck 42, within its cavity. Fluid is supplied to the gap between workpiece and chuck via the conduits 45 to 47 which feed the angularly equispaced bores 44. The latter direct their fluid streams into the gap in a direction perpendicular to the engaged surfaces of the workpiece.

Figure 5A:
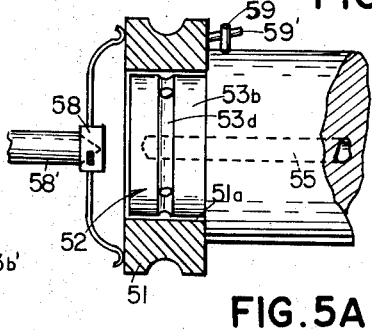
FIG. 5A is a side-elevational view, with parts broken away, of another mandrel according to the invention.
Figure 5B:
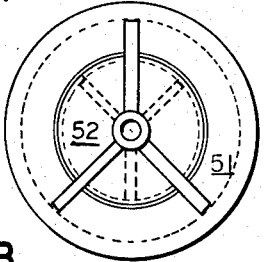
FIG. 5B is an end-elevational view of the mandrel of FIG. 5A.

FIGS. 5A and 5B illustrate an embodiment of the invention generally similar to that of FIGS. 2A and 2B. A mandrel 52 carries a ring 51 spaced therefrom by a fluid cushion. The gap is fed by fluid under pressure from the conduit 55 via the equispaced radial bores 54. The latter open into a peripheral groove 53d in the surface 53b of the mandrel which confronts the surface 51a of the ring. Frictional contact between the ring 51 and the mandrel 52 is enhanced by means of a spider 58 whose arms engage the ring and whose hub is urged in an axial direction by the tailstock center 58'. The spider rotates freely upon the center 58' while allowing the ring substantial freedom of displacement in a plane perpendicular to its axis to insure centering by the laminar-flow fluid cushion. Should the frictional entrainment of workpiece by the mandrel be insufficient, the latter may be provided with a projecting formation adapted to engage the workpiece positively. This formation may be in the form of a stud 59 rigidly affixed to the chuck 52 and adapted to engage a pin 59' projecting from the ring.

The workpiece holder disclosed hereinabove has the added advantage of readily lending itself to installation in a control system wherein the movement of a tool support toward the holder is arrested if no workpiece is in place, or if the workpiece is improperly held because of incorrect dimensioning of its seating surface, as more fully described in my application Ser. No. 54,613, filed on even date herewith, now Patent No. 3,056,319 issued Oct. 2, 1962.

I claim:

1. The method of centering a workpiece in a holder rotatable about an axis which comprises maintaining a laminar flow of a fluid under pressure in an annular clearance surrounding said axis between confronting limitedly spaced closed peripheral surfaces of said holder and said workpiece, and entraining said workpiece along with said holder.

2. The method according to claim 1 wherein said fluid is air and said clearance ranges between substantially 0.01 and 0.02 mm.

3. The method according to claim 1, further comprising the step of urging said workpiece into frictional engagement with said holder.

4. A centering holder for a workpiece, comprising a body rotatable about an axis and having a closed peripheral surface encompassing said axis, and means at said surface for introducing a fluid into an annular clearance extending in the direction of said axis between said surface and a confronting peripheral surface of a workpiece limitedly spaced therefrom, said body having means for entraining said workpiece.

5. A centering holder for a workpiece, comprising a body rotatable about an axis and having a closed peripheral surface provided with angularly spaced openings, said surface encompassing said axis, and means for admitting a fluid under pressure through said openings into an annular clearance extending in the direction of said axis between said surface and a confronting closed peripheral surface of a workpiece limitedly spaced therefrom, said body having means for entraining said workpiece.

6. A centering holder for a workpiece, comprising a body rotatable about an axis and having a closed peripheral surface encompassing said axis and provided with angularly equispaced openings and means for admitting a fluid under pressure through said openings into an annular clearance extending in the direction of said axis between said surface and a confronting closed peripheral surface of a workpiece limitedly spaced therefrom, said body having means for entraining said workpiece.

7. A centering holder for a workpiece, comprising a body rotatable about an axis and having a closed peripheral surface provided with an annular groove and with at least one opening at said groove, said surface encompassing said axis, and means for admitting a fluid under pressure through said opening and said groove into an annular clearance extending in the direction of said axis between said surface and a confronting closed peripheral surface of a workpiece limitedly spaced therefrom, said body having means for entraining said workpiece.

8. A centering holder for a workpiece, comprising a body rotatable about an axis and having a substantially cylindrical surface centered on said axis and provided with a plurality of angularly equispaced openings and means for admitting a fluid under pressure into an annular clearance extending in the direction of said axis between said surface and a confronting coaxial cylindrical surface of a workpiece limitedly spaced therefrom, said body having means for entraining said workpiece.

9. A centering holder for a workpiece, comprising a body rotatable about an axis and having a closed peripheral surface encompassing said axis, and angularly spaced means at said surface for directing a plurality of streams of fluid under pressure substantially perpendicularly to said surface toward a confronting closed peripheral surface of a workpiece limitedly spaced therefrom, said body having means for entraining said workpiece.

10. A centering holder for a workpiece, comprising a body rotatable about an axis and having a substantially cylindrical surface centered on said axis while having a plurality of substantially radial bores and means for admitting a fluid under pressure through said bores into an annular clearance extending in the the direction of said axis between said surface and a confronting coaxial cylindrical surface of a workpiece limitedly spaced therefrom, said body having means for entraining said workpiece.

11. A centering holder for a workpiece, comprising a body rotatable about an axis and having a closed peripheral surface encompassing said axis, means at said surface for introducing a fluid into an annular clearance extending in the direction of said axis between said surface and a confronting closed peripheral surface of a workpiece limitedly spaced therefrom, and means on said body for engaging said workpiece for entrainment thereof.

12. A centering holder for a workpiece, comprising a body rotatable about an axis and having a closed peripheral surface encompassing said axis, means at said surface for introducing a fluid into an annular clearance extending in the direction of said axis between said surface and a confronting closed peripheral surface of a workpiece limitedly spaced therefrom, and friction means on said body engageable with said workpiece.

13. In an apparatus for grinding an annular workpiece having an inner peripheral surface and an outer peripheral surface, in combination, a centering holder for said workpiece comprising a body rotatable about an axis and having a closed peripheral surface encompassing said axis, said body being provided with a plurality of angularly spaced radial bores terminating at said closed peripheral surface, means for introducing a fluid through said bores into an annular clearance extending in the direction of said axis between said closed peripheral surface and one of said peripheral surfaces of said workpiece limitedly spaced therefrom, said workpiece being entrained by said body; and grinding means engaging the other peripheral surface of said workpiece.

14. In an apparatus for grinding an annular workpiece having an inner peripheral surface and an outer peripheral surface, in combination, a centering holder for said workpiece comprising a body rotatable about an axis and having a closed peripheral surface encompassing said axis, said body being provided with a plurality of angularly spaced radial bores terminating at said closed peripheral surface, means for introducing a fluid through said bores into an annular clearance extending in the direction of said axis between said closed peripheral surface and one of said peripheral surfaces of said workpiece limitedly spaced therefrom, said body being provided with an abutment extending transversely to said axis; means for urging said workpiece axially against said abutment; and grinding means engaging the other peripheral surface of said workpiece.

References Cited in the file of this patent

UNITED STATES PATENTS

| | | |
|---|---|---|
| 2,625,061 | Mansfield | Jan. 13, 1953 |
| 2,670,146 | Heizer | Feb. 23, 1954 |
| 2,953,975 | Hoglund | Sept. 27, 1960 |

FOREIGN PATENTS

| | | |
|---|---|---|
| 548,363 | Great Britain | Oct. 4, 1942 |